United States Patent [19]

Birkestrand

[11] Patent Number: 4,739,682
[45] Date of Patent: Apr. 26, 1988

[54] TUBE END FINISHING MACHINE

[76] Inventor: Orville J. Birkestrand, 2705 Lee Ave., S. El Monte, Calif. 91733

[21] Appl. No.: 881,918

[22] Filed: Jul. 3, 1986

[51] Int. Cl.[4] .......................... B23B 3/22; B23G 1/22; B23C 1/20
[52] U.S. Cl. ..................... 82/4 C; 82/4 R; 409/179; 408/106; 408/108; 30/96; 269/284
[58] Field of Search ..................... 10/123.5; 30/96, 97; 82/4 R, 4 C; 269/196, 204, 228, 239, 271, 279, 280, 283, 284, 287, 288; 279/106, 109, 123; 409/179, 83.5; 408/104, 105, 107, 99, 112, 100, 101, 102, 106, 108

[56] References Cited

U.S. PATENT DOCUMENTS

| | | | |
|---|---|---|---|
| 1,107,511 | 8/1914 | Gallagher et al. | 30/101 |
| 1,623,045 | 4/1927 | Butt | 269/284 |
| 1,727,061 | 9/1929 | Hicks | 82/4 R |
| 1,962,641 | 6/1934 | Fowzer | 82/4 R |
| 2,928,368 | 3/1980 | Picard | 51/227 R |
| 3,076,364 | 2/1963 | Castiglia | 82/4 R |
| 3,837,633 | 9/1974 | Paulsen | 269/284 |
| 4,319,503 | 3/1982 | Saine et al. | 408/104 |
| 4,369,679 | 1/1983 | Jones | 82/4 C |
| 4,628,779 | 12/1986 | Louis | 82/38 R |

FOREIGN PATENT DOCUMENTS 2044656 10/1980 United Kingdom ................ 82/4 C

Primary Examiner—Nicholas P. Godici
Assistant Examiner—Edward A. Brown
Attorney, Agent, or Firm—John E. Wagner

[57] ABSTRACT

A tube and rod end finishing machine embodies a generally tubular portable housing within which a spindle carrying a finishing tool is axially movable. An end of the housing adjacent the tool forms one jaw of a clamshell work holder, the other jaw of which is pivoted on the housing on an axis normal to and intersecting the axis of the spindle, for movement toward and away from clamping relationship with said first mentioned jaw.

15 Claims, 6 Drawing Sheets

FIG. 7
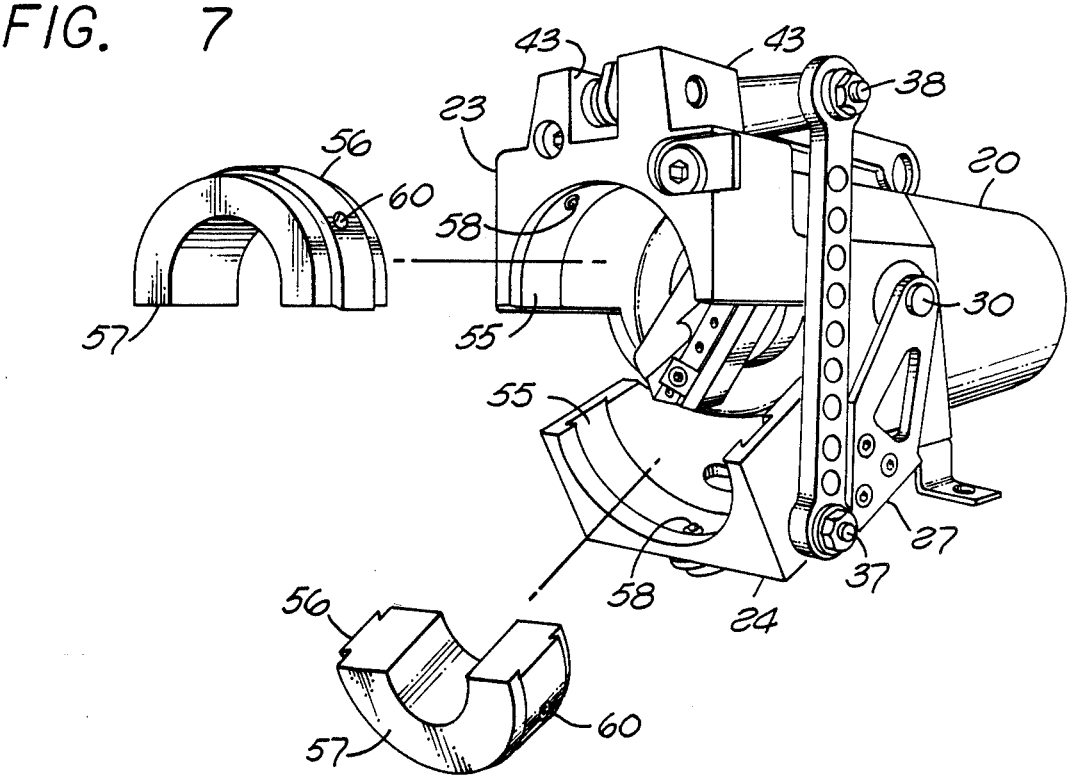
FIG. 8
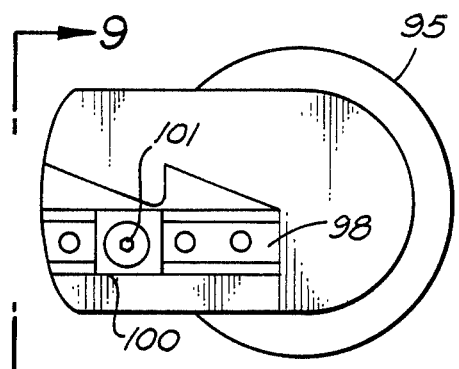
FIG. 9
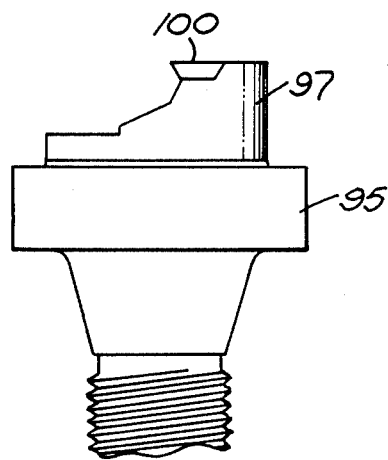
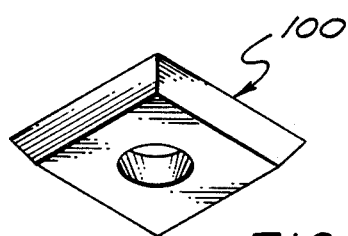
FIG. 10

TUBE END FINISHING MACHINE

The present invention relates to metalworking and more particularly to improvements in tube and rod end finishing machines.

In metalworking it frequently is necessary to finish the ends of tubes or rods by deburring, chamfering, flaring, beading, facing and the like, and many types of machines, both bench or floor mounted and portable, have been provided for such purposes. General specifications for such machines were set forth in Military Specification MIL-E 80222 dated July 8, 1971, and examples of such machines are described in the U.S. Pat. Nos. of Strout, 3,228,268, issued Jan. 11, 1966, and Saine, et al., 4,319,503, issued Mar. 16, 1982. A similar machine employing a clamshell work holder pivoted on an axis paralleling the spindle axis is cataloged by Conrac Corporation and identified as its Tubemaster series of models.

There is a recognized need however for a machine of this type sufficiently compact to be hand-carried into cramped quarters, yet versatile enough to perform a wide variety of tasks upon substitution of appropriate tool elements, and at the same time capable of high precision performance. It is the primary object of the present invention to meet this need, although other objects and advantages will be apparent from the following description.

SUMMARY OF THE INVENTION

The present invention provides an end finishing machine which is compact and portable, though also capable of being bench mounted. The conventional collet for holding the workpiece to be finished is replaced by a clamshell or die type workholder assembly opening on an axis normal to the spindle axis and carrying replaceable dies. The housing is made more compact by employing a drive shaft parallel to and overlapping the spindle, which drives the spindle through gearing permitting relative axial movement of the spindle with respect to the driveshaft. Any of a wide variety of tools may be mounted on the spindle and ajusted to perform extremely precise machining operations on a workpiece.

BRIEF DESCRIPTION OF THE DRAWINGS

FIG. 7 is a view in frontal perspective of the machine of FIG. 1 showing the dies removed from the clamshell workholder assembly;

FIG. 8 is an end view of one form of tool head assembly for use in the machine of the present invention;

FIG. 9 is a view in side elevation of the tool head assembly of FIG. 8;

FIG. 10 is a detail view in perspective of the tool mounted in the tool head assembly of FIG. 8;

FIG. 14 is a detail view partly in section of a clamping means shown in FIG. 6.

DETAILED DESCRIPTION OF THE PREFERRED EMBODIMENT

Figure 1:
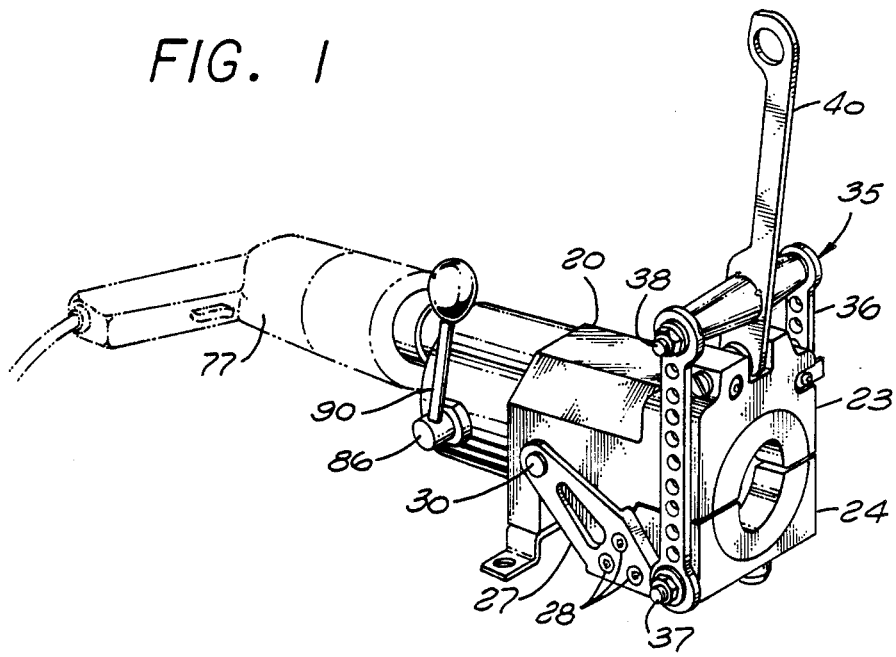
FIG. 1 is a view in perspective of a finishing machine embodying the present invention.

As shown in FIGS. 1, 2, 3 and 7, the machines of the present invention has a housing 20, generally tubular in shape, having a forward portion 21 carrying tool holding means and a rearward portion 22 to which motor driving means may be attached.

At the forward end of the housing 20 is a clamshell workholder assembly 25, the upper jaw 23 of which is integral with the forward portion 21 of the housing 20. The lower jaw 24 of the assembly 25 is pivotally mounted on the housing 20 by a swing bracket 27 secured to the jaw 24 by means such as screws 28 and pivoted to the housing 20 at 30; the axis of the pivot 30 being normal to the longitudinal axis of the housing 20 and intersecting the axis of the spindle, hereinafter described, which is disposed centrally of housing 20.

In order to attain the highest possible degree of precision it is desirable that, in manufacturing the housing 20 and assembly 25, all of the machining of the housing and jaws be done before the lower jaw 24 is separated from the upper jaw and housing. After this is done, the lower jaw may be separated from the housing by means such as electron discharge machining (EDM) wire cutting, and precise alignment of the assembly 25 with the central axis of housing 20 will be assured.

Figure 2:
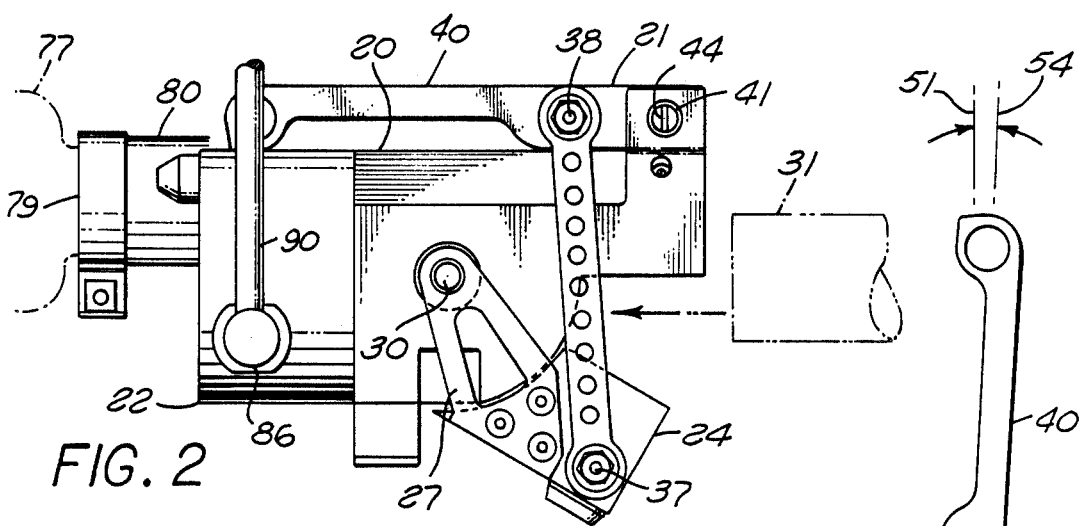
FIG. 2 is a view in side elevation of the machine of FIG. 1 with the clamshell workholder assembly in open position to receive a workpiece shown in phantom.
Figure 3:
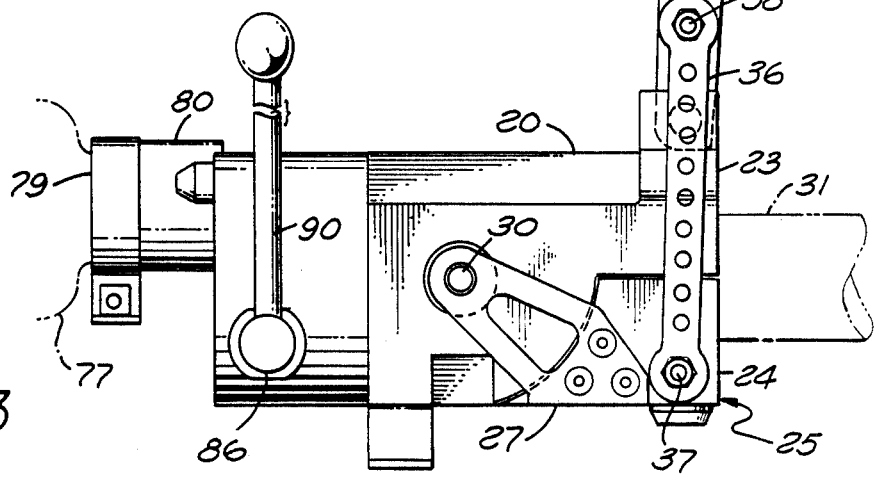
FIG. 3 is a view in side elevation of the machine of FIG. 1 with the clamshell workholder assembly in closed position clamping a workpiece, shown in phantom, in position to be finished.
Figure 6:
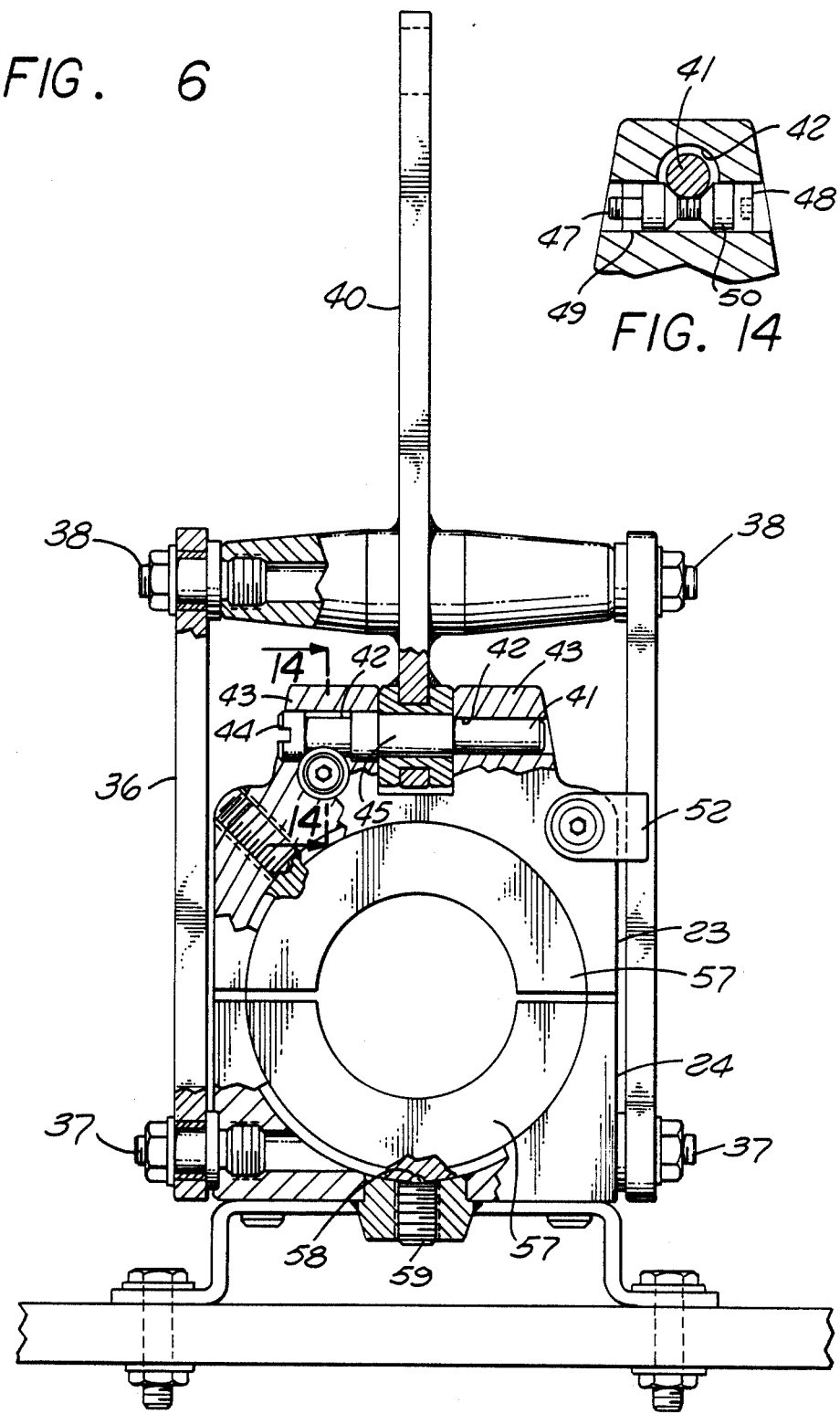
FIG. 6 is a view in front elevation and partly in section of the machine of FIG. 1.

Movement of the lower jaw 24 in an arcuate path toward the position shown in FIGS. 3 and 6 in which it clamps a workpiece, such as indicated at 31, in position for finishing, and away from that position to the open position of the clamshell, in which it is shown in FIG. 2 is accomplished by an over-center linkage 35 comprising a pair of oppositely disposed links 36 pivotally connected to the lower jaw 24 at 37 and at 38 to a jaw operating lever 40.

As shown in FIG. 6, the lever 40 is pivoted at its lower end on a pin 41 which slip fits into bores 42 in spaced lugs 43 integral with housing 20. The pin 41 has a slotted head, as shown at 44 and the center portion of pin 41 is eccentric, as shown at 45. This arrangement is such that by rotational adjustment of the pin 41, the position of the pivotal center of handle 40 may be adjusted so that it can be moved to a position slightly over or under center, as shown in FIG. 3 and thus effect a clamping of the lower jaw 24 against an over or undersized workpiece held against the upper jaw 23. A three piece wedge and screw assembly shown in detail in FIG. 14 comprising a cap screw 47 having an "Allen" hex head 48 and threaded through a nut 49 which may be tightened or loosened to cause wedges 50 to bear against or free pin 41 on a relieved diameter to hold the pin in any adjusted position. A stop lug 52 of FIG. 6 secured to the upper jaw 23 at 53 lies in the path of movement of one of the links 36 and permits controlled movement of the link slightly past the over-center position 51 indicated in FIG. 3 at 54.

As shown in FIGS. 6 and 7, each of the jaws 23, 24 has an interior surface a circumferentially extending groove 55 which is of full or half dovetail shape. These grooves 55 are designed to receive dies of various interior diameters and shapes, and every such die is, according to the present invention, provided on is outer surface with at least one complementary ridge 56 of dovetail shape. This arrangement is such that when the die's ridge or ridges are fitted into the jaw's grooves, the dies are secured against displacement other than endwise. To releasably secure them against endwise displacement each jaw is provided with a spring pressed ball 58 caged in a container 59 (FIGS. 6 and 7) threaded into the wall of the jaw and extending into the groove 55, and each die designed for use in the machine of the present invention is to be provided with a ball receiving recess 60 (FIG. 7) in its complementary groove 56.

Figure 4:
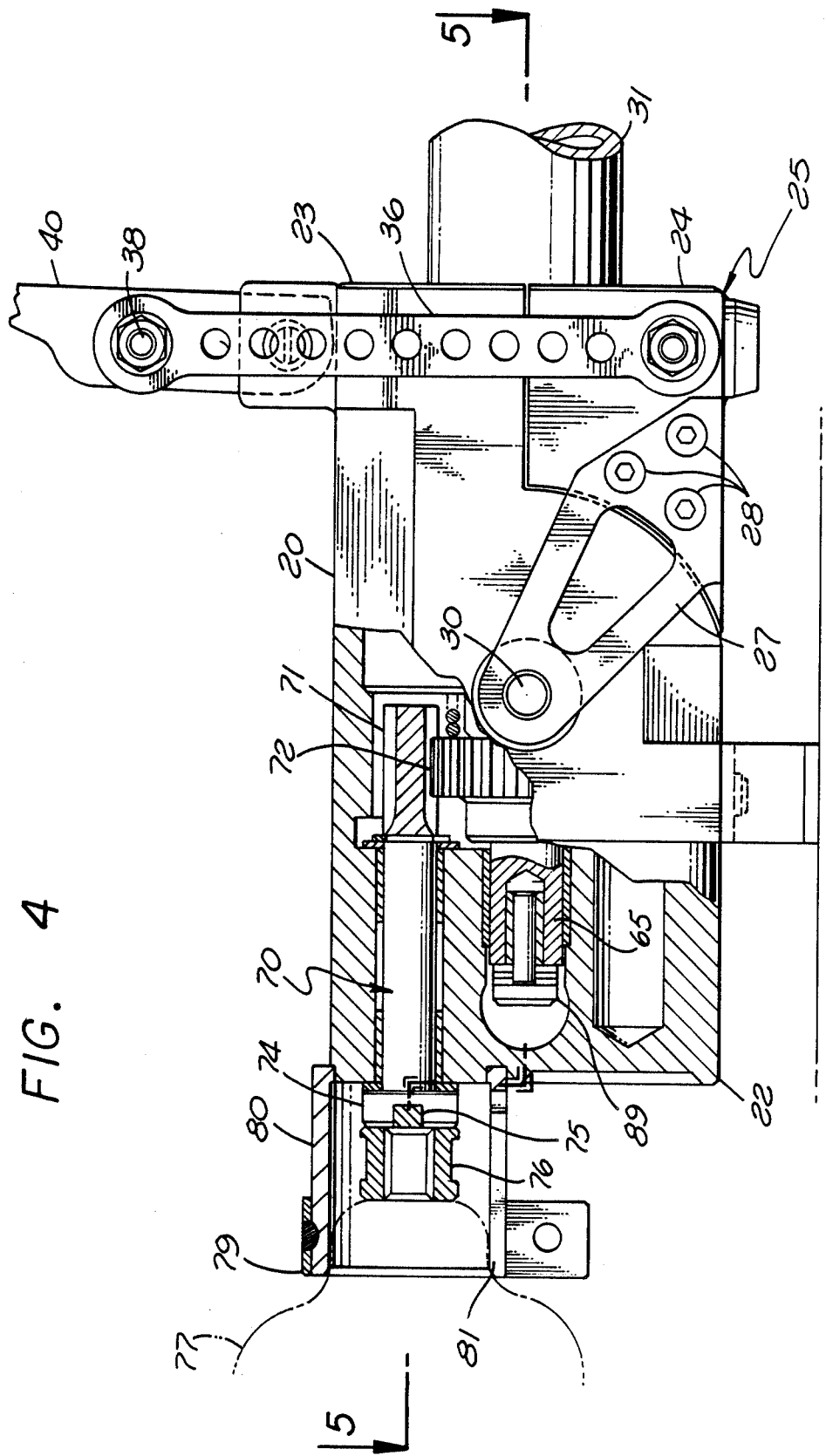
FIG. 4 is a side elevational view partly in section illustrating the spindle drive mechanism.
Figure 5:
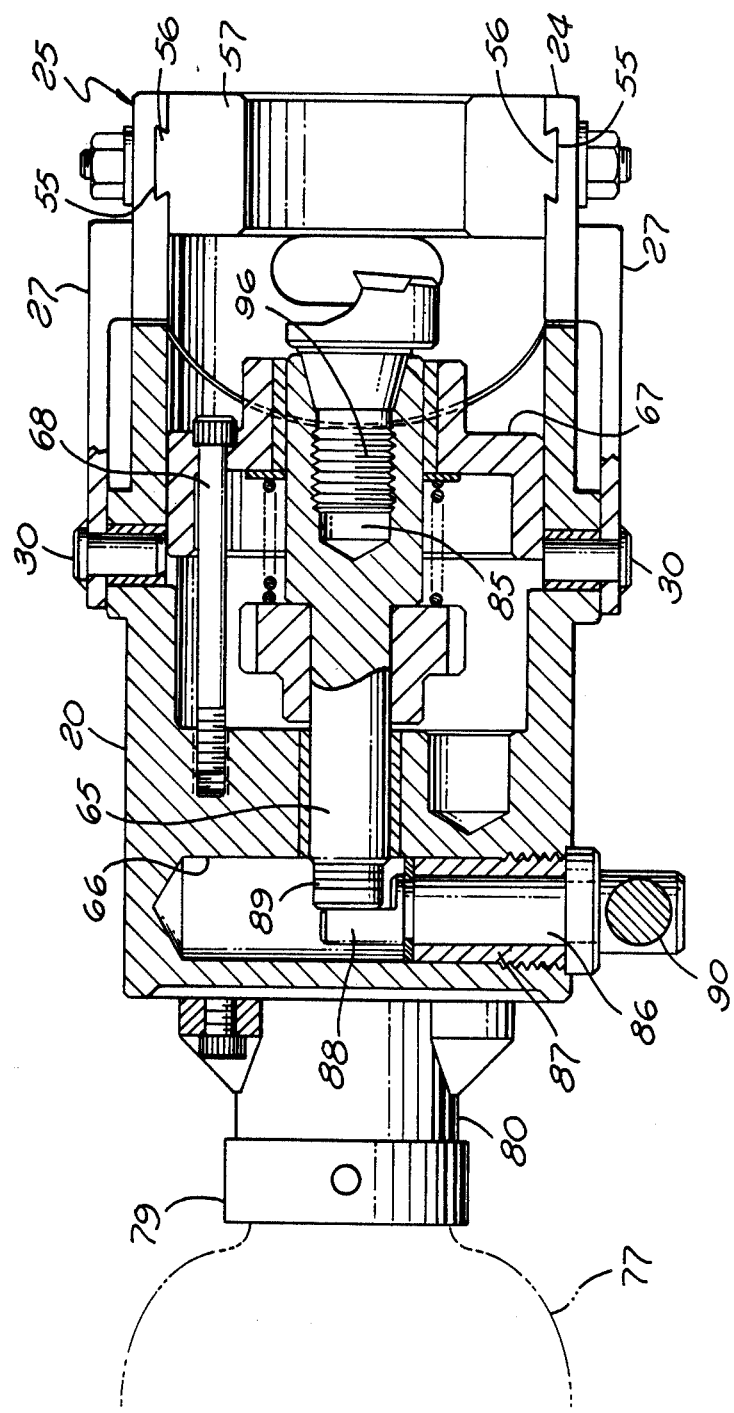
FIG. 5 is a horizontal view in section taken generally along the line 5—5 of FIG. 4 illustrating the mechanism for effecting axial movement of the spindle.

As shown in FIG. 5, there is journalled at the axis of the housing 20 a spindle 65, the rearward portion of which is supported for axial movement in a bulkhead 66 integral with the housing 20 and the forward portion of which is similarly supported in a bulkhead 67 which is retained in position by screws 68 anchored in the bulkhead. Also journalled in the bulkhead 66 is a drive shaft 70 (FIG. 4) which is journaled parallel to the spindle 65 and carries at its forward end a pinion 71 which meshes with a drive gear 72 fixed to the spindle 65; the pinion being of sufficient width to maintain driving engagement with the drive gear 72 throughout the limited axial movement of the spindle hereinafter described.

The drive shaft 70 carries on its rear end a coupling member 74 connected by a keyway and key 75 to a motor drive coupling 76 into which the threaded shaft of a typical portable drill motor, indicated at 77 may be threaded. Such a motor may be clamped in position, as shown, by clamping a band 79 around a ring 80 which is split as at 81 and sized to embrace a portion of the casing of such a motor.

As shown in FIG. 5, the spindle 65 is provided at its forward end with a screw threaded tool socket 85 which is adapted to receive any of a plurality of different types of tool holders carrying various tools for finishing the ends of tubes or rods, and means are provided for effecting axial movement of spindle 65 to bring a tool so carried on the end of the spindle into engagement with the end of a tube clamped in the clamshell workholder assembly 25. This means for effecting axial movement comprises a feed control shaft 86 carried in a journal 87 threaded into the side of the housing 20 and carrying at its inner end an eccentrically mounted pin 88 which is engageable with a thrust button 89 rotatably mounted in a recess centrally of the rear end of spindle 65. At its outer end, the feed control shaft may carry a handle 90 to provide any needed leverage for moving a tool against a workpiece.

An example of a toolholder and tool for squaring the end of a tube is illustrated in FIGS. 8, 9 and 10. This toolholder includes a body 95 having a threaded portion 95 for reception in the tool socket 85. A tool mounting block 97 is carried on the face of the body 95 to provide a ramp 98 for mounting a tool bit 100 at any of a number of selected positions. The tool bit 100 is secured to the ramp 98 by a screw 101 by which it may be attached at a selected position and moved radially or rotated in position as may be required by wear during operation.

Figure 11:
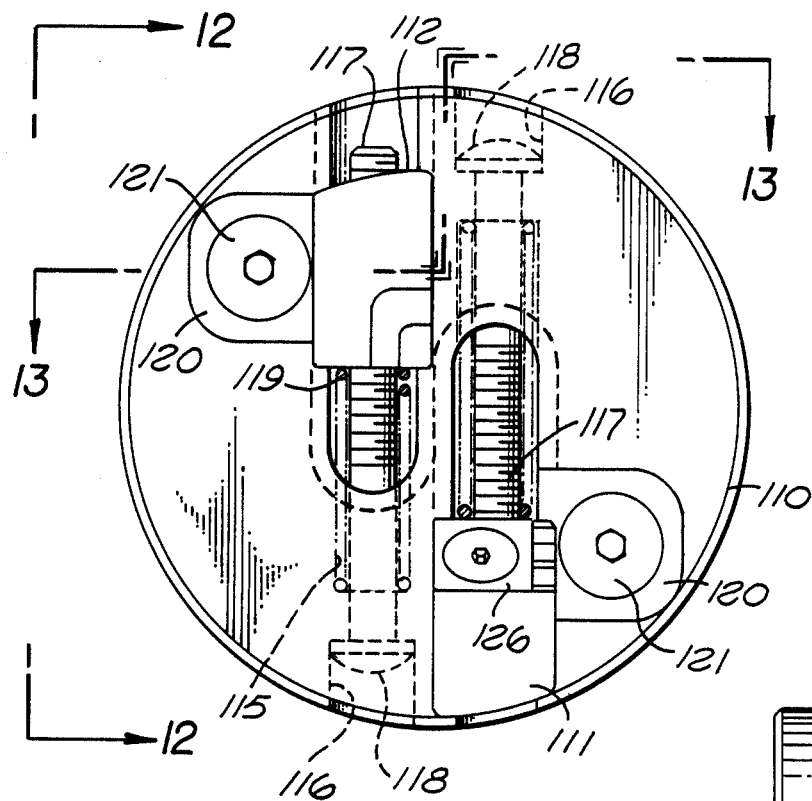
FIG. 11 is an end view of another tool head assembly for use in the machine of the present invention.
Figure 12:
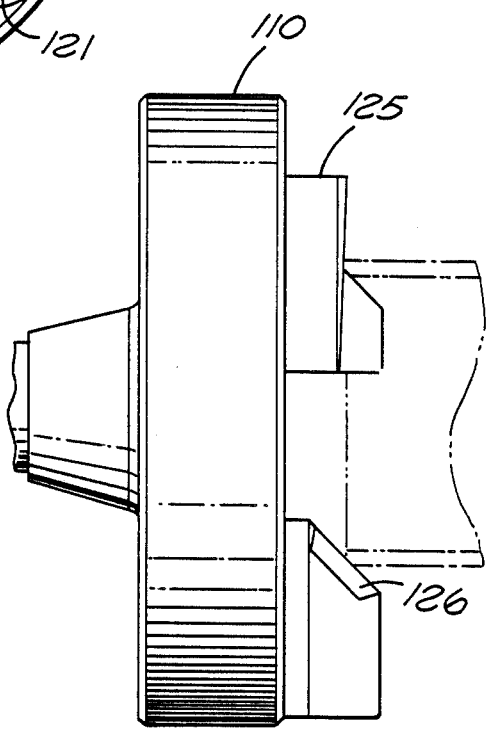
FIG. 12 is a view in side elevation along the line 12-12 of FIG. 11 of the tool head assembly of FIG. 11.
Figure 13:
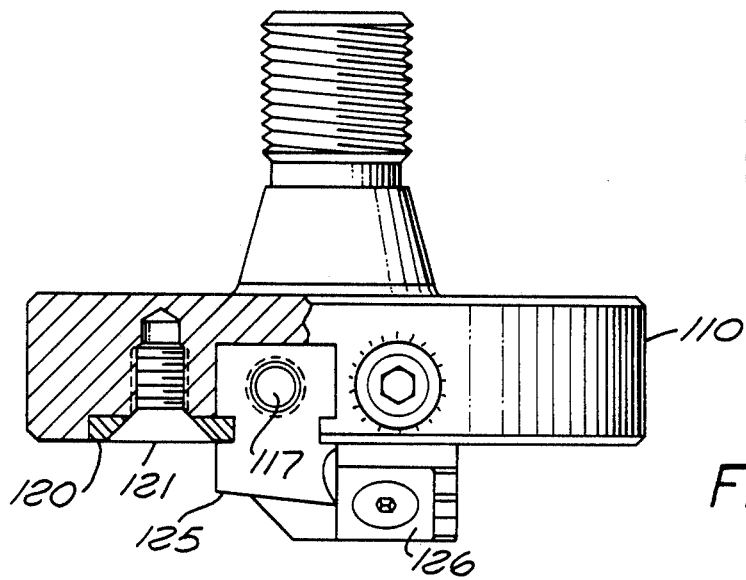
FIG. 13 is a view in side elevation and partly in section taken along the line 13—13 of FIG. 11, of the tool head assembly of FIG. 11.

A novel toolhead for simultaneously chamfering the inside and outside edges of a tube as well as facing it is illustrated in FIGS. 11, 12 and 13. In this device, a tool body 110 carried two tool mounting blocks 111 and 112 each of which is adjustable independently of the other. For this purpose the tool body 110 is provided with parallel recessed tracks 115 extending from one edge to the other of the tool body 110 each provided with a counterbore 116 at an end opposite the counterbored end of the other track. A precision adjustment screw 117 with precision scribe marks on its head is disposed in each of the tracks 115 with its slotted head 118 in the counterbore of the track. A spring 119 is compressed between thread 118 and the respective mounting block 111, 112, each of which is threaded on one of the screws 117 so that backlash effect is eliminated. A clamping block 120 is releasably secured by a screw 121 adajcent each track 115 in engagement with an edge of each mounting block 111, 112, wherein each block can be firmly secured in any position to which it has been adjusted by its screw 117.

A tool bit such as tool bit 124 for chamfering the inner edge and simultaneously facing of a tube end is removably and adjustably secured to one of the mounting blocks 111. A tool bit 126 for chamfering the outer edge of the same tube is similarly removable and adjustably secured to the other mounting block 112. Both tool bits 125 and 126 are then adjusted to the proper positions by means of their precision adjustment screws 117 and secured in such positions by clamping blocks 120. The tool body 110 is then screwed into the tool socket 85, a tube end to be finished is clamped in position by the clamshell workholder assembly and, after any necessary final adjustments are made, the motor is started, the speed is adjusted and the handle 90 is operated to bring the tool bits 125 and 126 against the tube end.

The independently and oppositely parallel array of cutter blades of FIGS. 11-13 allows the precise finishing of tubes on three surfaces in a single operation. Facing the end and beveling the interior corner is accomplished by the cutter 125. while outside beveling is completed at the same time by cutter 126.

Precision holding of regular, oversize or undersize tubes is provided by the workpiece holder of FIG. 7. The cooperation of these features results in a precision tool for tube end finishing.

The clamshell work piece holder of FIG. 7 also allows finishing a flared tube or using this tool as a flaring device by substitution of a flaring tool for the cutters shown.

The overall length of the tool is reduced by the use of the shaft 70 which is located in parallel with the spindle 65 and the clamshell workpiece holder. In one embodiment of this invention, a 3 inch tube may easily be faced with access to only approximately ¾ inch of the tube length.

The foregoing embodiments are merely illustrative of the principle of this invention and are not to be considered as limiting. It is recognized that one skilled in the art of tube finishing machines may construct such a machine which may be different in certain respects without departing, in fact, from the spirit of this invention. This invention is instead defined by the following claims including their equivalents.

What is claimed is:

1. In a tube and rod end finishing machine having a housing, a spindle axially movable with respect thereto, and means for mounting a tool on one end of said spindle;

the improvement comprising:

a clamshell workholder means for clamping a workpiece in position to be engaged by a tool mounted on said spindle including a first jaw fixed with respect to said housing adjacent said tool mounting means; and a second jaw carried by an arm pivotally mounted on said housing on an axis normal to and intersecting the axis of rotation of said spindle, for movement of said second jaw in an arcuate path toward and away from clamping relationship with said first jaw.

2. The improvement of claim 1 in which there is removably mounted in each of said jaws a die configured to the exterior of the workpiece to be clamped between said jaws.

3. The improvement of claim 2 in which the contiguous surfaces of the dies and jaws are joined by dovetail joints, 4. The improvement of claim 3 in which resilient retention means are provided for retaining said dies against endwise separation from said dovetail joints.

5. The improvement of claim 1 including additionally means for moving said second jaw into and out of clamping relationship with said first jaw comprising a lever pivotally mounted adjacent one end of said first jaw, and a linkage pivoted to said lever between its pivotal mounting on said first jaw and its opposite end, and to said second jaw.

6. The improvement of claim 5 in which the arcuate path of movement of said second jaw is about an axis intersecting the axis of rotation of said spindle.

7. The improvement of claim 5 in which there is removably mounted in each of said jaws a die configured to the exterior of the workpiece to be clamped between said jaws.

8. The improvement of claim 7 in which the contiguous surfaces of the dies and jaws are joined by dovetail joints.

9. The improvement of claim 8 in which resilient retention means are provided for retaining said dies against endwise separation from said dovetail joints.

10. The improvement of claim 5 in which
the pivotal mounting on said first jaw includes means including an adjustable eccentric pin for changing the pivotal center of said lever to vary the clamp of the second jaw against the first jaw.

11. The improvement of claim 10 including additionally means for limiting the movement of said lever to a clamping position slightly past a position over center with respect to its pivot.

12. The improvement of claim 10 in which the arcuate path of movement of said second jaw ia about an axis intersecting the axis of rotation of said spindle.

13. The improvement of claim 10 in which there is removably mounted in each of said jaws a die configured to the exterior of the workpiece to be clamped between said jaws.

14. The improvement of claim 13 in which the contiguous surfaces of the dies and jaws are jointed by dovetail joints.

15. The improvement of claim 14 in which resilient retention means are provided for retaining said dies against endwise separation from said dovetail joints.

* * * * *